United States Patent [19]
Arai et al.

[11] Patent Number: 4,542,410
[45] Date of Patent: Sep. 17, 1985

[54] AUTOMATIC DIAPHRAGM CONTROL DEVICE OF OBJECTIVE PROVIDED WITH AUTOMATIC DIAPHRAGM FOR CLOSED CIRCUIT TELEVISION (CCTV) CAMERA

[75] Inventors: Masayuki Arai; Terumi Ogasawara; Tohru Shikano, all of Tokyo, Japan

[73] Assignee: Asahi Seimitsu Kabushiki Kaisha, Tokyo, Japan

[21] Appl. No.: 504,860

[22] Filed: Jun. 16, 1983

[30] Foreign Application Priority Data

Dec. 14, 1982 [JP] Japan .................... 57-218945

[51] Int. Cl.⁴ ............................................. H04N 5/26
[52] U.S. Cl. ................................................... 358/228
[58] Field of Search ............... 358/228, 174, 217, 209

[56] References Cited

U.S. PATENT DOCUMENTS

| 3,918,046 | 11/1975 | Rivers | 358/217 |
| 4,268,866 | 5/1981 | Rodgers | 358/228 |
| 4,300,167 | 11/1981 | Miller et al. | 358/210 |
| 4,451,851 | 5/1984 | Arai et al. | 358/228 |
| 4,472,743 | 9/1984 | Arai et al. | 358/228 |

Primary Examiner—Gene Z. Rubinson
Assistant Examiner—Robert Lev
Attorney, Agent, or Firm—Birch, Stewart, Kolasch & Birch

[57] ABSTRACT

A control circuit for automatically opening and closing the diaphragm of the objective lens of a closed circuit television (CCVT) camera including a variable gain inverting amplifier for amplifying and inverting video signals from the camera, a voltage doubler and rectifier with an adjustable capacitor coupled to the output of the inverting amplifier, a voltage level shifter coupled to the output of the voltage doubler for lowering signals output therefrom by a predetermined voltage, a power supply for providing bias voltage to said control circuit, an intermediate voltage supply circuit for providing a signal reference voltage to said circuit which is intermediate to the value of said bias voltage, and a comparator circuit for comparing the intermediate voltage with the signal output from said level shifter and opening or closing the diaphragm based on the results of the comparison.

4 Claims, 3 Drawing Figures

1

AUTOMATIC DIAPHRAGM CONTROL DEVICE OF OBJECTIVE PROVIDED WITH AUTOMATIC DIAPHRAGM FOR CLOSED CIRCUIT TELEVISION (CCTV) CAMERA

BACKGROUND OF THE INVENTION

The present invention relates to an automatic diaphragm control device for an objective lens provided with an automatic diaphragm in a closed circuit television (CCTV) camera. The objective lens diaphragm is controlled in response to brightness levels of video signals received by the television camera.

For the closed circuit television (CCTV) cameras in video systems, it has usually been necessary for the objective lens provided with an automatic diaphragm to contain a complicated control circuit comprising many elements and having functions not only of a light measuring mode conversion, but also of sensitivity regulation. Consequently, the objective lens has been too bulky to be easily handled. Further, there has recently been a tendency to provide lower source voltages for energization of such control systems as the development of a small-sized cameras has progressed, and there has developed a demand for a novel control circuit compatible with the lower power sources and small-sized cameras.

SUMMARY OF THE INVENTION

Accordingly, it is a primary object of the present invention to provide an automatic diaphragm control circuit for the objective lens of a closed circuit television (CCTV) camera with a reduced number of circuit elements, which results in a compact objective lens assembly that is compatible with small-sized cameras.

It is a further object of the present invention to provide an automatic control circuit for the automatic diaphragm of the objective lens of a CCTV camera which facilitates the desired diaphragm control at a relatively low source voltage.

The objects of the present invention are fulfilled by providing an automatic diaphragm control circuit for the objective lens of a closed circuit television (CCTV) camera comprising an inverting amplifier with a variable gain adapted to be applied to a video signal coming from the television camera and to invert and amplify said video signal, a voltage doubler including a capacitor with charging voltage adjustment means therefor for voltage doubling and rectification of the output signal coming from said inverting amplifier, a level shifter adapted to lower the level of the rectified signal by a predetermined voltage, an intermediate voltage supplying circuit adapted to supply an intermediate voltage with respect to a power source voltage, and a diaphragm driving circuit adapted to compare the intermediate voltage supplied from said intermediate voltage-supplying circuit with the rectified signal coming from said level shifter and to adjust the diaphragm on the basis of a result of such comparison.

BRIEF DESCRIPTION OF THE DRAWINGS

The objects of the present invention will become more fully understood from the detailed description given hereinbelow and the accompanying drawings which are given by way of illustration only and thus are not limitative of the present invention and wherein.

DETAILED DESCRIPTION OF THE DRAWINGS

The present invention will be described in more detail with reference to an embodiment shown by the accompanying drawings.

Figure 1:
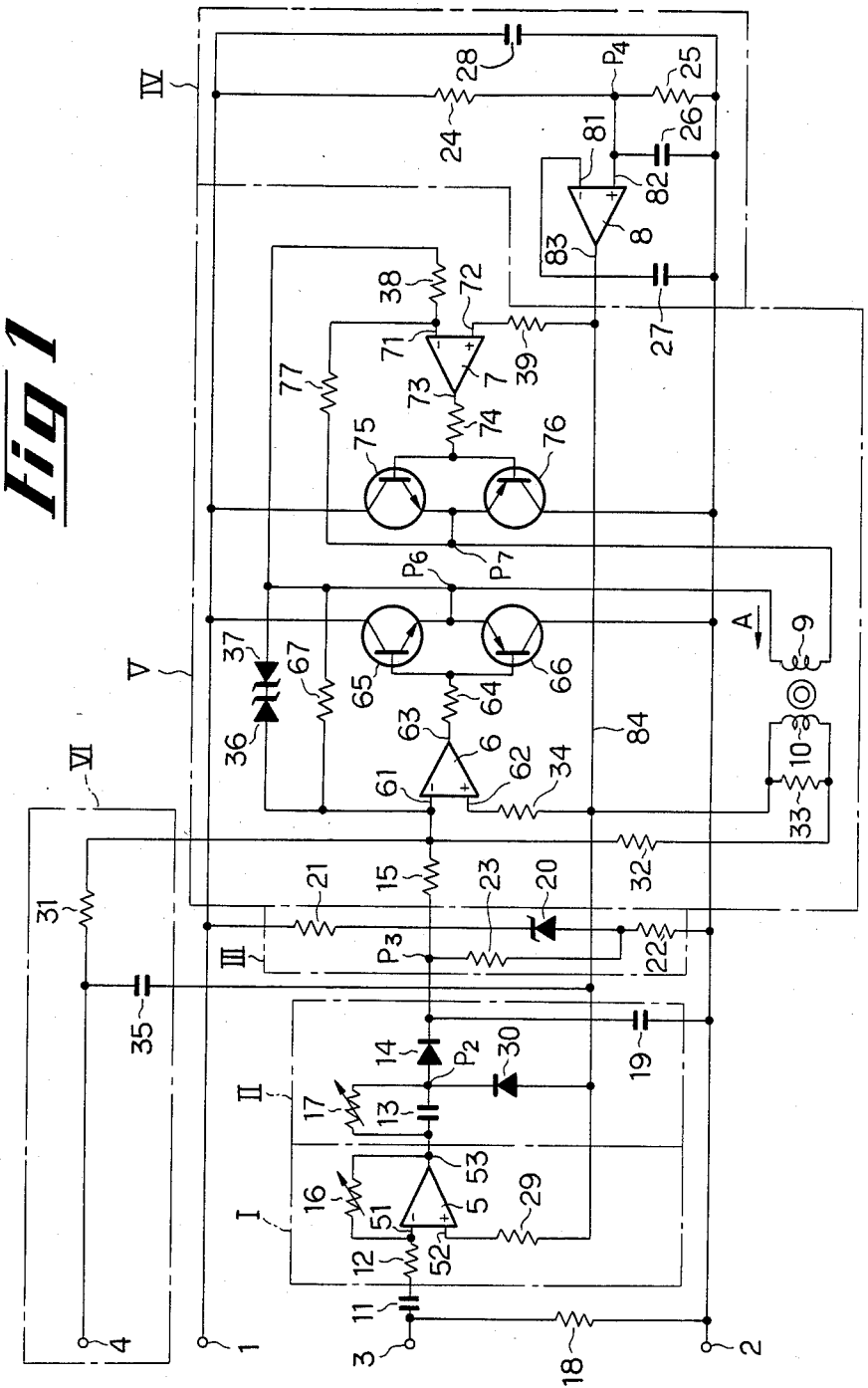
FIG. 1 is a circuit diagram illustrating an embodiment of the device according to the present invention.

FIG. 1 is a circuit diagram showing an embodiment of the device constructed according to the present invention, in which reference numeral 1 designates a plus voltage side and reference numeral 2 designates a grounded side, respectively, of a power source circuit. Reference numeral IV designates an intermediate voltage-supplying circuit connected to said power source circuit and adapted to provide a voltage of intermediate (preferably $\frac{1}{2}$) level with respect to a power source voltage at an intermediate voltage terminal 84. In the embodiment shown, a smoothing capacitor 28 and series resistances 24, 25 are connected in parallel across the positive voltage side 1 and the grounded side 2 of the power source. A node $P_4$ between said resistances 24, 25 is connected to a noninverting input terminal 82 of an operational amplifier 8 while an inverting input terminal 81 is directly connected to an output terminal 83, and said noninverting input terminal 82 and said output terminal 83 are connected via capacitors 26, 27, respectively, to the grounded side 2 so that said voltage of $\frac{1}{2}$ level relative to the power source voltage is output at the intermediate (middle point) voltage terminal 84.

Reference numeral 3 designates a video signal input terminal adapted to input video signals from a television camera to the control circuit according to the present invention, and is connected via a resistance 18 to the grounded side 2 on one hand, and via a capacitor 11 to an inverting amplifier I, on the other hand.

In the inverting amplifier I, an inverting input terminal 51 of an operational amplifier 5 is connected via a resistance 12 to said capacitor 11 while a noninverting input terminal 51 is connected via resistance 29 to the intermediate voltage terminal 84. A variable resistance 16 is connected, as a feedback resistance, between said inverting input terminal 51 and an output terminal 53. The inverting amplifier I is adapted for amplifying and inverting the video signal of which the DC component has been eliminated in said capacitor 11 and permits an amplification degree of the operational amplifier 5 which may be controlled by adjusting the variable resistance 16.

Reference numeral II designates a voltage doubler functioning to rectify the video signal which has been amplified and inverted by said inverting amplifier I and comprises a voltage doubling capacitor 13 connected to the output terminal 53 of said operational amplifier 5 in parallel with a variable resistance 17, a diode 30 via which the intermediate voltage terminal 84 is connected to an output terminal $P_2$ of said capacitor 13, and another diode 14 serially connected to said output terminal $P_2$. The variable resistance 17 is provided to regulate a charging voltage for the voltage doubling capacitor 13 so that when the charging voltage becomes zero, the capacitor 13 is not activated at a resistance value of zero and the charging voltage rises as the resistance value increases. The diode 14 is adapted for DC rectification of the signal at the output P$_2$ of the capacitor 13. Further, there is connected a capacitor 19 between the output terminal of the diode 14 and the grounded side 2 to smooth said rectified signal.

Reference numeral III designates a level shifter comprising a resistance 21, a Zener diode 20 and a resistance 22 via which the plus voltage side of power source 1 is connected to the grounded side 2, and a resistance 23 via which the minus side (i.e., anode side) of the Zener diode 20 is connected to an output terminal P$_3$ of the voltage doubler II. This level shifter functions to reduce the rectified signal from the voltage doubler toward the minus side of the power supply by a predetermined voltage, and thereby to level-shift said rectified signal so that the behaviour range thereof extends on the plus and minus sides with respect to the intermediate voltage.

Reference numeral V designates a diaphragm driving circuit adapted to compare the output signal from the level shifter III with the intermediate voltage and to drive the diaphragm in a direction according to a result of this comparison. In the diaphragm driving circuit V, an operational amplifier 6 has its inverting input terminal 61 connected via a resistance 15 to the output terminal P$_3$ of the voltage doubler II, its noninverting input terminal 61 connected via a resistance 34 to the intermediate voltage terminal 84, and its output terminal 63 connected via a resistance 64 to the commonly-connected basis of transistors 65, 66. The transistor 65 functions as a switching element which takes a conductive state when the base voltage rises to a level higher than a predetermined value while the transistor 66 functions as a switching element, which takes a non-conductive state when the base voltage drops to a level lower than a predetermined value. The transistor 65 is of the NPN type with its collector connected to the emitter of the transistor 66, the latter being of the PNP type. This transistor 66 has its collector connected to the grounded side 2. To eliminate any unresponsive ranges of these switching transistors 65, 66, a feedback resistance 67 is connected between a common emitter terminal P$_6$ and the reversed input terminal 61 of the operational amplifier 6, while a pair of mutually opposed Zener diodes 36, 37 are arranged in parallel to said feedback resistance 67. Said emitter terminal P$_6$ is connected via the resistance 38 to the inverting input terminal 71 of an operational amplifier 7, while a noninverting input terminal 72 of said operational amplifier 7 is connected via a resistance 39 to the intermediate voltage terminal 84. An output terminal 73 of the operational amplifier 7 is connected via a resistance 74 to the commonly-connected basis of transistors 75, 76. The transistor 76 functions as a switching element, adapted to take a conductive state when the base voltage drops to a level lower than a predetermined value. The transistor 75 is of the NPN type with its collector connected to the plus voltage side 1 of the power source circuit, and its emitter commonly connected to the emitter of transistor 76, which is of the PNP type. The transistor 76 has its collector connected to the grounded side 2 of the power source circuit. To eliminate any unresponsive ranges of these switching transistors 75, 76, there is connected a feedback resistance 77 between a common emitter terminal P$_7$, and the inverting input terminal of the operational amplifier 7. There is provided a diaphragm driving coil 9 between both common emitter terminals P$_6$, P$_7$, so that the diaphragm is driven in an opening direction as electric current flows in the direction of an arrow A. A braking coil 10, adapted for control of the diaphragm speed is connected via a series resistance 32 and a parallel resistance 33 between the inverted input terminal 61 of the operational amplifier 6 and the intermediate voltage terminal 84.

Reference numeral VI designates a remote voltage supplying circuit for remote control of sensitivity regulation and comprises a remote voltage input terminal 4 connected via a resistance 31 to the inverting input terminal 61 of the operational amplifier 6, on one side, and connected via a capacitor 35 to the intermediate voltage terminal 84.

Figure 2A:
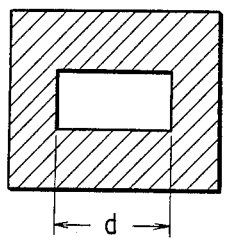
FIG. 2 is a series of diagrams schematically illustrating the relationship established between a test object to be picked up by the camera and signal waveforms in each stage of the circuit of FIG. 1.
Figure 2B:
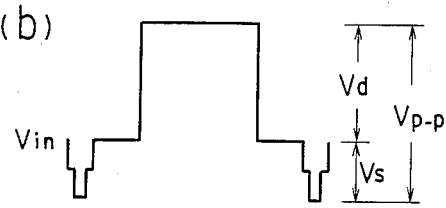
Figure 2C:
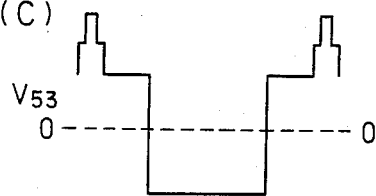

In the embodiment of the device constructed, as has been described above according to the present invention, it is now assumed that the video signal input terminal 3 is supplied with a video signal V$_{in}$ having a waveform as shown in FIG. 2(b), corresponding to a test pattern of an object, as shown in FIG. 2(a). Of this waveform, a rectangular portion of the plus side corresponds to a bright area of the image. Reference symbol V$_d$ represents a video level and reference symbol V$_s$ represents a synchronous level. Such video level V$_{in}$ is inversely amplified, as shown in FIG. 2(c) by the inverting amplifier I and appears in the form of an inverted signal V$_{53}$, with its DC component already eliminated by the capacitor 11. In consequence, a steady state is established in which the positive and negative portions of the waveform occupy equal areas with respect to the base line (i.e., the line 0—0 corresponding to the intermedate voltage). The amplification degree of the reversing amplifier I may be increased as the variable resistance 16 is adjusted toward a higher resistance value, and may be decreased as said variable resistance 16 is reduced. By adjusting the amplification degree in this manner, it is possible to adjust an amplitude V$_{p-p}$ of the inverted signal V$_{53}$, and thereby achieve sensitivity regulation.

Figure 2D:
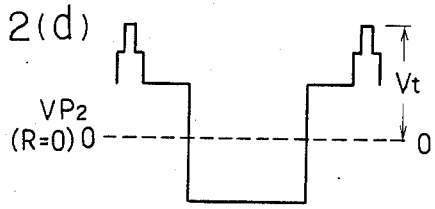
Figure 2E:
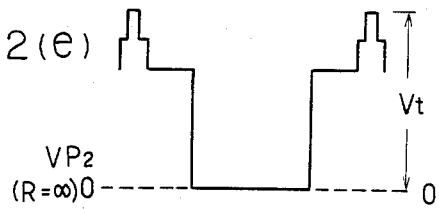

The inverted signal V$_{53}$ is then rectified by the voltage doubler II. When the resistance value of the variable resistance 17 is adjusted to zero, the capacitor 13 is not activated at all, and a signal VP$_2$ appearing at the output terminal P$_2$ of said capacitor 13, coincides with the inverted signal V$_{53}$, as shown in FIG. 2(d). In this case, the diode 30 is responsive to the minus portion of the inverted signal V$_{53}$ to become conductive; but this minus portion is passed through the resistance 17(R=O) and never charged into the capacitor 13. Thus, the plus voltage V+ is given in the form of an average value, so that such light measuring mode may be referred to as the average light measuring mode suitable for picking up an object to which is covered substantially by a relatively dark area. When the resistance value of the variable resistance 17 is adjusted to infinity, the diode 30 is responsive to the minus portion of the inverted signal V$_{53}$ to become conductive, and this minus portion is charged into the capacitor 13. The subsequent plus portion of the signal is added to the previously charged voltage, and the output signal VP$_2$ is subjected to DC regeneration as shown in FIG. 2(e), so that it is possible to detect the amplitude of the video level V$_d$ even when the width d of the lighter portion is small. Accordingly, the light measuring mode with the variable resistance 17 having a resistance value adjusted to infinity, may be referred to as the peak light measuring mode suitable for picking up an object which is covered substantially by a relatively light area. Further, another mode of light measuring, referred to as the intermediate light measuring mode, is also possible. This mode is intermediate of said average light measuring mode and said peak light measuring mode, and achieved by adjusting the resistance value of the variable resistance 17 to an intermediate value.

Figure 3A:
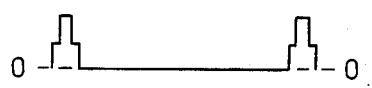
FIG. 3 is a diagram illustrating the signal waveform appearing at the output terminal $P_3$ of FIG. 1 when a relatively dark object is picked up by the camera.
Figure 3B:
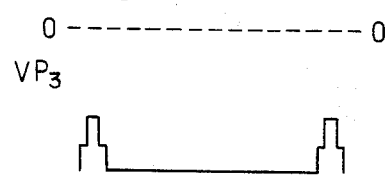

The signal rectified by said voltage doubler II takes the similar waveform to the plus portion of the output signal $VP_2$ from the capacitor 13 and is positive with respect to the intermediate voltage (line 0—0), as shown in FIG. 3(a), even in the darkest object conditions, since the input signal $V_{in}$ contains the synchronous level $V_s$. However, the device according to the present invention should function on the basis of the intermediate voltage. To meet this requirement, the rectified signal is level-shifted by the level shifter toward the minus side so that the signal level is lowered by a predetermined voltage, and the video signal corresponding to a relatively dark image is on the minus side with respect to the intermediate voltage. Thus, the signal $VP_3$, appearing at the output terminal $P_3$ has, as shown in FIG. 3(b), its waveform on the minus side and is responsive to a darker video signal incoming to be lowered relative to the intermediate voltage. In this manner, the signal $VP_3$ at the output terminal $P_3$ can be used within equal ranges on both the plus side (when an object to be picked up is relatively bright) and the minus side (when the object is relatively dark), respectively.

The signal which has left the level shifter III is applied to the inverting input terminal 61 of the operational amplifier 6. In the optimum video condition, an input voltage $V_{61}$ is equal to the intermediate voltage, while an output voltage $V_{63}$ at the output terminal 63 is equal to the intermediate voltage $e/2$, and neither the transistor 65 nor the transistor 66 is activated, so that the driving coil 9 is not energized. When an object to be picked up is relatively bright, i.e., the input voltage $V_{61} > e/2$, such input voltage $V_{61}$ is inversely amplified by the operational amplifier 6 with respect to the intermediate voltage so that a relationship of the output voltage $V_{63} < e/2$ is established, thereby the transistor 66 becomes conductive across its collector and emitter, and a voltage $VP_6 < e/2$ appears at the emitter terminal $P_6$. When this voltage $VP_6$ is inversely amplified again by the operational amplifier 7 with respect to the intermediate voltage, an output voltage $V_{73} > e/2$ appears at the output terminal 73 of said amplifier 7, and the transistor 75 becomes conductive across its collector and emitter. The transistors 66, 75 which have become conductive in this manner, permit the plus side 1 of the power source circuit to provide electric current flowing through the transistor 75, and then in the direction opposite to the direction indicated by the arrow A. The diaphragm driving coil 9 is thereby activated to close the diaphragm.

When an object to be picked up is relatively dark, i.e., the input voltage $V_{61} < e/2$, on the contrary, such input voltage $V_{61}$ is inversely amplified by the operational amplifier 6 with respect to the intermediate voltage so as to produce the output voltage $V_{63} > e/2$, and the transistor 65 becomes conductive across its collector and emitter, resulting in the voltage $VP_6 > e/2$ appearing at the emitter terminal $P_6$. When this voltage $VP_6$ is inversely amplified again by the operational amplifier 7 with respect to the intermediate voltage, the output terminal 73 of this operational amplifier 7 now provides the output voltage $V_{73} > e/2$, in response to which the transistor 76 becomes conductive across its collector and emitter. Once the transistors 65, 76 have become conductive in this manner, the electric current flows from the plus side of the power source circuit through the transistor 65, and then, in the direction of the arrow A, through the diaphragm driving coil 9 which is thereby activated to open the diaphragm. Such opening and closing movement of the diaphragm generates an electromotive force in the braking coil 10, so as to apply the inverted input terminal 61 of the operational amplifier 6 with feedback, and thereby prevents the diaphragm from oscillating. This assures that said opening or closing movement occurs at a constant speed. Application of a plus or negative constant voltage via the remote input terminal 4 to the inverted input terminal 61 of the operational amplifier 6 permits the signal level to be raised or lowered, and sensitivity regulation to be achieved by remote control without adjustment of the variable resistance 16 for the inverting amplifier I.

As will be clear from the foregoing description, the automatic diaphragm control circuit for the objective lens of a closed circuit television (CCTV) camera according to the present invention permits sensitivity regulation to be achieved by regulating the amplification degree of the inverting amplifier, and permits a relatively compact objective lens assembly to be employed therein, since the number of circuit elements used can be substantially reduced. Furthermore, the output voltage of the diaphragm control signal can be used over equal extensions on both the plus side and the minus side, because an intermediate voltage to the power supply voltage is used as the reference voltage according to the present invention. Thus, it is possible to achieve the desired diaphragm control within a range as wide as possible, even when the power source voltage is relatively low.

It should be understood that the present control circuit may be modified as would occur to one of ordinary skill in the art without departing from the spirit and scope of the present invention.

What is claimed is:

1. An automatic control circuit for opening and closing the diaphragm of the objective lens for a video camera comprising:
   power source means for providing a bias voltage to said control circuit;
   inverting amplifier means for receiving video signals output from said video camera and amplifying and inverting said signals;
   voltage doubler means including capacitor means for doubling and rectifying the signals output from said inverting amplifier means;
   means for adjusting the sensitivity of said control circuit;
   level shifter means for lowering the level of the doubled and rectified signals output from said doubler means by a predetermined voltage;
   intermediate voltage supply circuit means for supplying said control circuit with a voltage which is intermediate with respect to said bias voltage; and
   diaphragm control means for comparing said intermediate voltage with signals output from said level shifter means and opening or closing said diaphragm in response to the results of the comparison.

2. The control circuit of claim 1, wherein said means for adjusting the sensitivity of said control circuit comprises a variable gain control for said inverting amplifier and means for adjusting the charging current to the capacitor means.

3. The control circuit of claim 2, wherein said means for adjusting the charging current comprises a variable resistor in parallel with said capacitor.

4. The control circuit of claim 1, wherein said means for adjusting said sensitivity of said control circuit comprises control voltage for superimposing a sensitivity control voltage on the signals output from said level shifter means.

* * * * *